US011405818B2

(12) United States Patent
Zachrison et al.

(10) Patent No.: US 11,405,818 B2
(45) Date of Patent: *Aug. 2, 2022

(54) NETWORK NODE AND METHOD IN A WIRELESS COMMUNICATIONS NETWORK

(71) Applicant: Telefonaktiebolaget LM Ericsson (publ), Stockholm (SE)

(72) Inventors: Mats Zachrison, Örebro (SE); Raimundas Gaigalas, Hässelby (SE); Jonas Wiorek, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 112 days.

This patent is subject to a terminal disclaimer.

(21) Appl. No.: 16/955,873

(22) PCT Filed: Dec. 20, 2017

(86) PCT No.: PCT/SE2017/051318
§ 371 (c)(1),
(2) Date: Jun. 19, 2020

(87) PCT Pub. No.: WO2019/125250
PCT Pub. Date: Jun. 27, 2019

(65) Prior Publication Data
US 2021/0022034 A1 Jan. 21, 2021

(51) Int. Cl.
*H04W 28/02* (2009.01)
*H04W 28/08* (2009.01)
(Continued)

(52) U.S. Cl.
CPC ....... *H04W 28/0289* (2013.01); *H04L 47/127* (2013.01); *H04L 47/74* (2013.01); *H04W 28/0942* (2020.05); *H04W 28/26* (2013.01)

(58) Field of Classification Search
None
See application file for complete search history.

(56) References Cited

U.S. PATENT DOCUMENTS 9,030,940 B2 * 5/2015 Szabo .................. H04W 28/02
370/241
11,115,844 B2 * 9/2021 Johansson ......... H04W 72/1263
(Continued)

FOREIGN PATENT DOCUMENTS

WO 2013/139472 A1 9/2013

OTHER PUBLICATIONS

International Search Report and Written Opinion issued in International Application No. PCT/EP2017/051318 dated Aug. 29, 2018 (15 pages).

(Continued)

*Primary Examiner* — Alex Skripnikov
(74) *Attorney, Agent, or Firm* — Rothwell, Figg, Ernst & Manbeck, P.C.

(57) ABSTRACT

A method performed by a network node for performing Congestion Control in a wireless communications network is provided. The network node serves a number of User Equipments, UEs, comprising a first and one or more second UEs. The first UE has a radio resource allocated for communication between the first UE and the network node. The network node estimates (203) a first prediction of a forthcoming usage of the allocated radio resource, based on a measured data traffic between the network node and the first UE. The network node further determines (205) a first threshold related to the first prediction, as a function of a measured data traffic load between the network node and the number of UEs. The network node then performs (206) congestion control by deciding whether or not to initiate a removal of the radio resource allocated to the first UE, based on whether or not the first prediction exceeds the first threshold.

13 Claims, 16 Drawing Sheets

(51) Int. Cl.
  *H04L 47/127* (2022.01)
  *H04L 47/74* (2022.01)
  *H04W 28/26* (2009.01)

(56) References Cited

U.S. PATENT DOCUMENTS

2012/0058792 A1* 3/2012 Liang ................... H04W 48/06
                                                    455/509
2016/0150442 A1   5/2016 Kwan et al.
2018/0027567 A1* 1/2018 Saghir .................... H04W 4/08
                                                    370/230
2019/0021101 A1* 1/2019 Wang ................ H04W 72/1242
2021/0100000 A1* 4/2021 Zachrison ............. H04W 24/08

OTHER PUBLICATIONS

Sciancalepore, Vincenzo et al., "Mobile Traffic Forecasting for Maximizing 5G Network Slicing Resource Utilization", IEEE INFOCOM 2017—IEEE Conference on Computer Communications, Oct. 5, 2017 (9 pages).

* cited by examiner

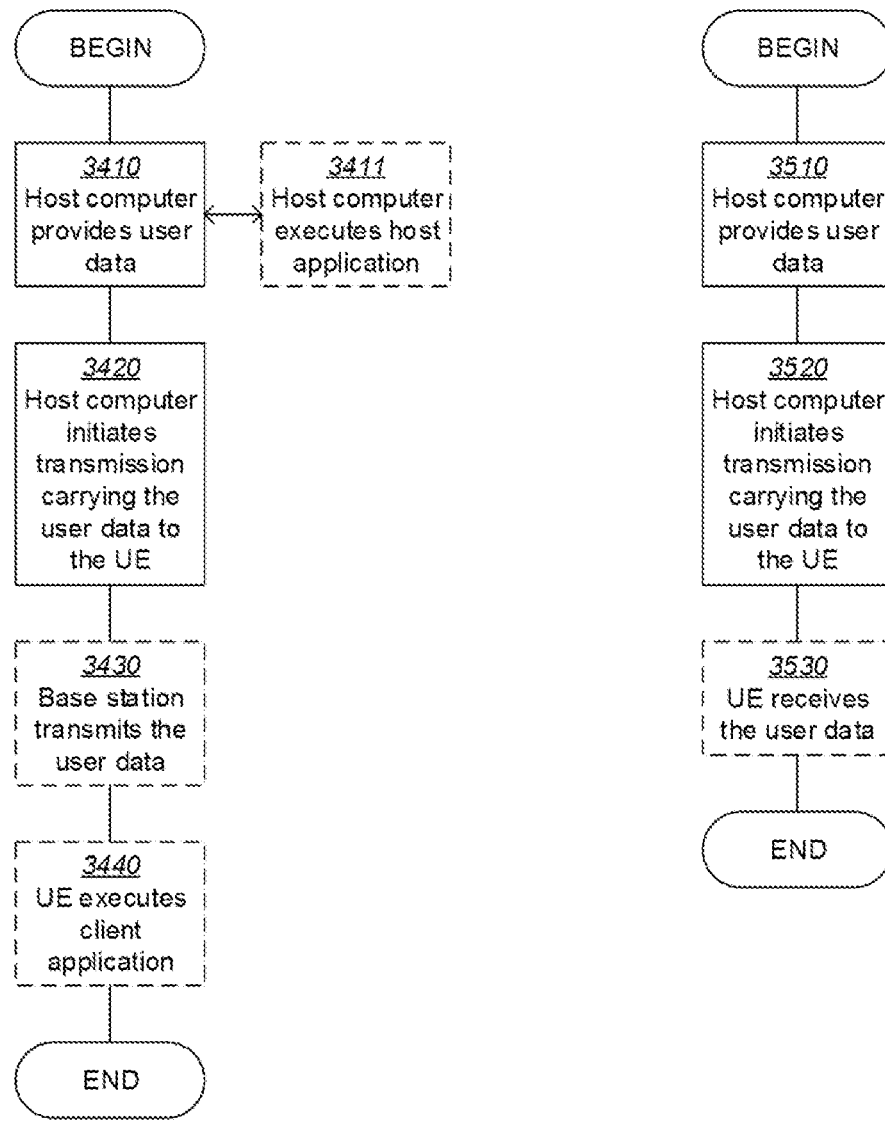

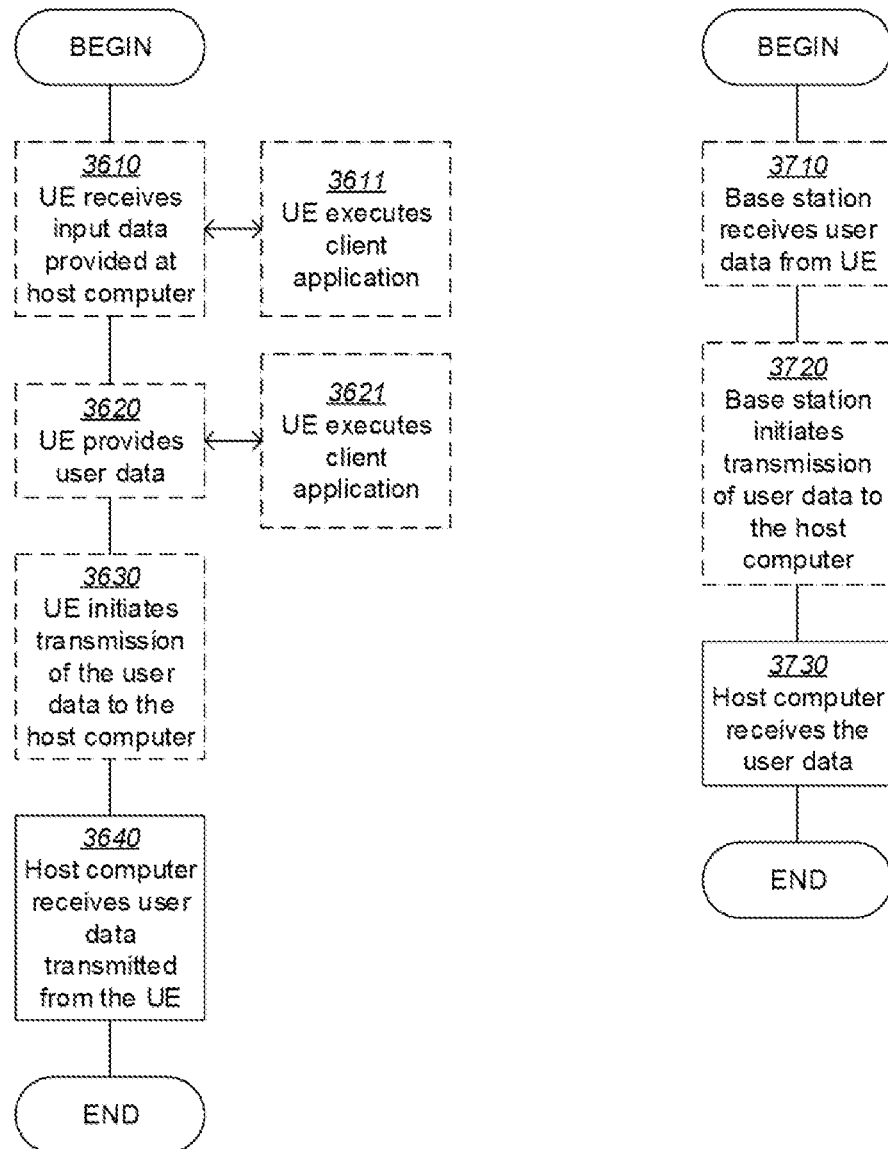

NETWORK NODE AND METHOD IN A WIRELESS COMMUNICATIONS NETWORK

CROSS REFERENCE TO RELATED APPLICATION(S)

This application is a 35 U.S.C. § 371 National Stage of International Patent Application No. PCT/SE2017/051318, filed Dec. 20, 2017, designating the United States.

TECHNICAL FIELD

Embodiments herein relate to a network node and methods therein. In particular, they relate to improving performance in a wireless communications network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Machine Learning (ML) is a field in computer science where a computer through algorithms and methods can be trained to learn certain patterns and their representation, so when confronted with similar data patterns the computer can take decisions related to the data, e g predictions, classifications, and actions.

Admission Control (AC) is a control function in a closed system such as e.g. used in a wireless communications system, where access or resources are made available to requesting candidates such as UEs, which may be straight forward if resources are abundant, and more selective when resources get scarce.

Congestion Control (CC) is a control function in a closed system such as e.g. used in a wireless communications system, to avoid overloading by reducing the allocated resources. CC may be quite tolerant if resources are abundant, and more aggressive when resources get scarce.

How the congestion of a system or resources is controlled is a major factor for determining the efficiency of the resource utilization, and hence a large part of the performance of a wireless communications system. system.

Traditional methods to handle out radio resources are at best using hysteresis to even out variations in regulated stimuli levels. All users are treated equally in terms of usage, and additional resource will in many cases be handed out to the wrong users, such as e.g. to users with low capacity demand resulting in that they never utilize the full capacity of the additional resources. In a loaded scenario users that requires more resources will instead be terminated or moved to less powerful resource levels. In these cases the resources are not utilized efficiently and the total system performance will be suffering.

SUMMARY

An object of embodiments herein is to improve the performance of a wireless communications network.

According to a first aspect of embodiments herein, the object is achieved by a method performed by a network node improving performance in a wireless communications network. The network node serves a number of User Equipments, UEs, comprising a first UE and one or more second UEs. The first UE has a radio resource allocated for communication between the first UE and the network node. The network node estimates a first prediction of a forthcoming usage of the allocated radio resource, based on a measured data traffic between the network node and the first UE. The network node further determines a first threshold related to the first prediction, as a function of a measured data traffic load between the network node and the number of UEs. The network node then performs congestion control by deciding whether or not to initiate a removal of the radio resource allocated to the first UE, based on whether or not the first prediction exceeds the first threshold.

According to a second aspect of embodiments herein, the object is achieved by a network node for improving performance in a wireless communications network. The network node is configured to serve a number of User Equipments, UEs, comprising a first UE and one or more second UEs. The first UE is adapted to have a radio resource allocated for communication between the first UE and the network node. The network node is configured to:

estimate a first prediction of a forthcoming usage of the allocated radio resource, based on a measured data traffic between the network node and the first UE, determine a first threshold related to the first prediction, as a function of a measured data traffic load between the network node and the number of UEs, and perform congestion control by deciding whether or not to initiate a removal of the radio resource allocated to the first UE, based on whether or not the first prediction exceeds the first threshold.

Since the network node estimates the first prediction based on measured data traffic between the network node and the first UE, and determines the first threshold based on data traffic load at the network node and the number of UEs, and then performs congestion control based on whether or not the first prediction exceeds the first threshold, the congestion control is performed dynamically based on a current condition instead of being static. This will in turn improve the performance of a wireless communications network.

An advantage with embodiments herein is that varying conditions is handled in an efficient way without any tuning or complex remodeling schemes involved and is applicable for different models, various targets, and condition alterations.

An advantage with embodiments herein is that less radio resources will be wasted by removing resources e.g. from UEs with low demands during the remainder of the connection.

Another advantage is the reduction of configuration required for the CC of the method. The radio resources are automatically distributed to the UEs that will use them most efficiently.

BRIEF DESCRIPTION OF THE DRAWINGS

Examples of embodiments herein are described in more detail with reference to attached drawings in which:

FIGS. 14 to 17 are flowcharts illustrating methods implemented in a communication system including a host computer, a base station and a user equipment.

DETAILED DESCRIPTION

As a part of developing embodiments herein a problem will first be identified and discussed.

As mentioned above, UEs are treated equally in terms of usage and no adaptation to e.g. different traffic patterns is included. This means that a UE is not granted resources based on the predicted requirement, so additional resource will in many cases be handed out to the wrong users. This results in that the resources are not utilized efficiently and the total system performance will be suffering. E.g. when using ML for controlling congestion of a system or resources, the accuracy of the decisions is a highly vital characteristic, and traditional models do not include methods for improving accuracy during fluctuating conditions. In a dynamic environment, this is not sufficient, and more situation adapted schemes are needed to utilize the full potential of admission control. Further, when used over time in a dynamic environment more situation adapted schemes are needed to utilize the full potential of the method.

Embodiments herein provide inherent characteristics of individual UE predictions which are utilized to improve performance for a measure e.g. over time with the highest momentary importance, and thereby attain a dynamic and in some embodiments timely behavior automatically adapting to various conditions of the execution environment. This is to avoid arbitrariness in how the resources are distributed a mechanism of prediction of resource usage needs per individual UE or connected UE. This mechanism may both be supporting the CC by predicting users with low demands for a remainder of a connection. In some embodiments also in combination with a former AC by predicting users with high demands, for the connection.

Example embodiments herein provide a method such as e.g. an ML model based CC that is suitable where the surrounding conditions varies, and the requirements on a prediction accuracy may fluctuate. In embodiments herein, inherent characteristics of the individual predictions such as total data volume in either direction, the total service time for the connection, or the time to the next data burst, either as a direct value or the probability that the level will be over or under a certain limit. The inherent characteristics are utilized to improve performance for the measure e.g. over time, with a highest momentary importance. This will result in a dynamic behaviour automatically adapting to various conditions of the execution environment.

In some embodiments of the method e.g. by means of an ML model, former AC is performed combined with CC that will improve the utilization rate of the resources, leading to better system performance.

Figure 1:
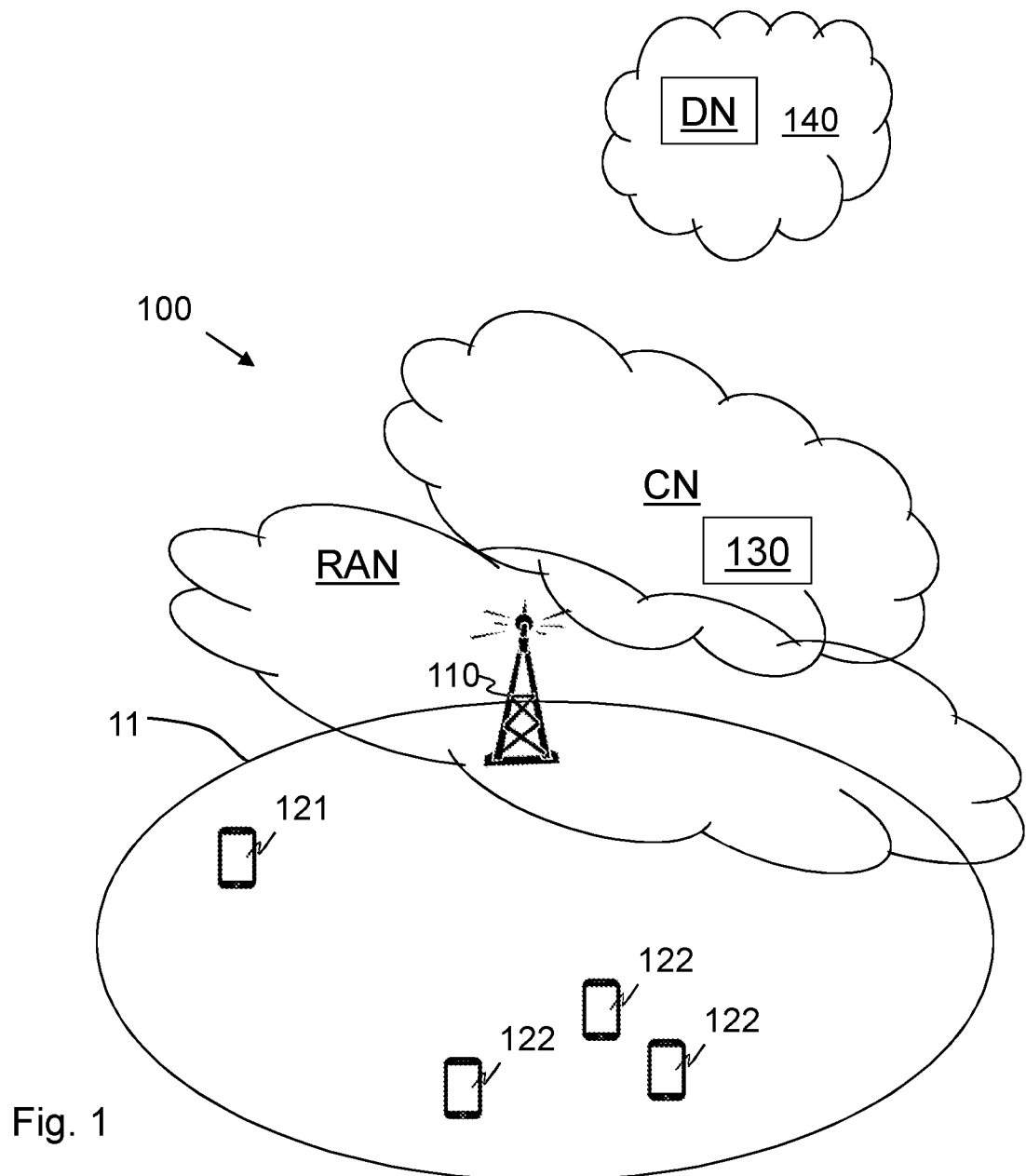
FIG. 1 is a schematic block diagram illustrating embodiments of a wireless communications network.

Embodiments herein relate to wireless communication networks in general. FIG. 1 is a schematic overview depicting a wireless communications network 100. The wireless communications network 100 comprises one or more RANs and one or more CNs. The wireless communications network 100 may use NR but may further use a number of other different technologies, such as, 5G, NB-IoT, CAT-M, Wi-Fi, eMTC, Long Term Evolution (LTE), LTE-Advanced Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as a network node 110, providing radio coverage over a geographical area, a cell 11. The cell 11 may also be referred to as a service area, beam or a group of beams.

The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point or an Access Point Station (AP STA), an access controller, or any other network unit capable of communicating with a UE within the cell 11 served by the network node 110 depending e.g. on the radio access technology and terminology used. The network node 110 may be referred to as a serving radio network node and communicates with a UE 121, 122 with Downlink (DL) transmissions to the UE 121, 122 and Uplink (UL) transmissions from the UE 121, 122.

UEs such as e.g. a number of UEs comprising a first UE 121 and one or more second UEs 122 operate in the wireless communications network 100. The UEs 121, 122 may e.g. be a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more Access Networks (AN), e.g. RAN, to one or more core networks (CN). It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

Further network nodes operate in the wireless communications network 100, such as a network node 130. The network node 130 may be an MME which is a control node for an LTE access network and an NR network, an Serving Gateway (SGW), and a Packet Data Network Gateway (PGW).

Figure 4:
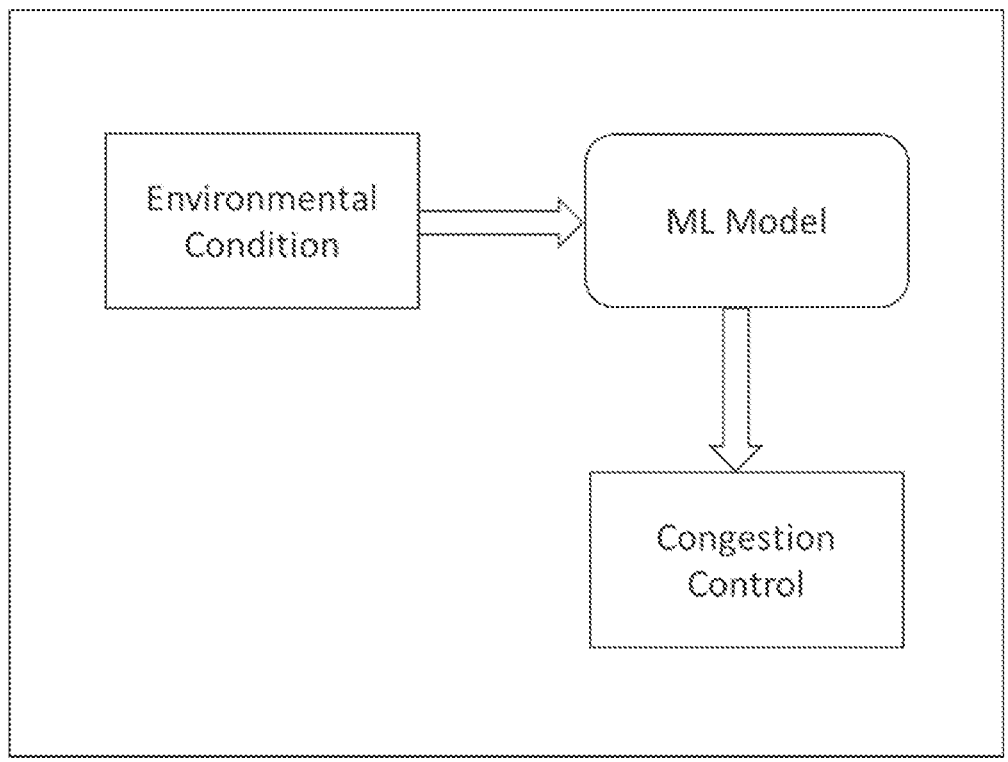
FIG. 4 is a schematic block diagram illustrating embodiments implemented in a network node.

Methods according to embodiments herein may be performed by the network node 110. As an alternative, a Distributed Node DN and functionality, e.g. comprised in a cloud 140 as shown in FIG. 4 may be used for performing or partly performing the methods.

Figure 2A:
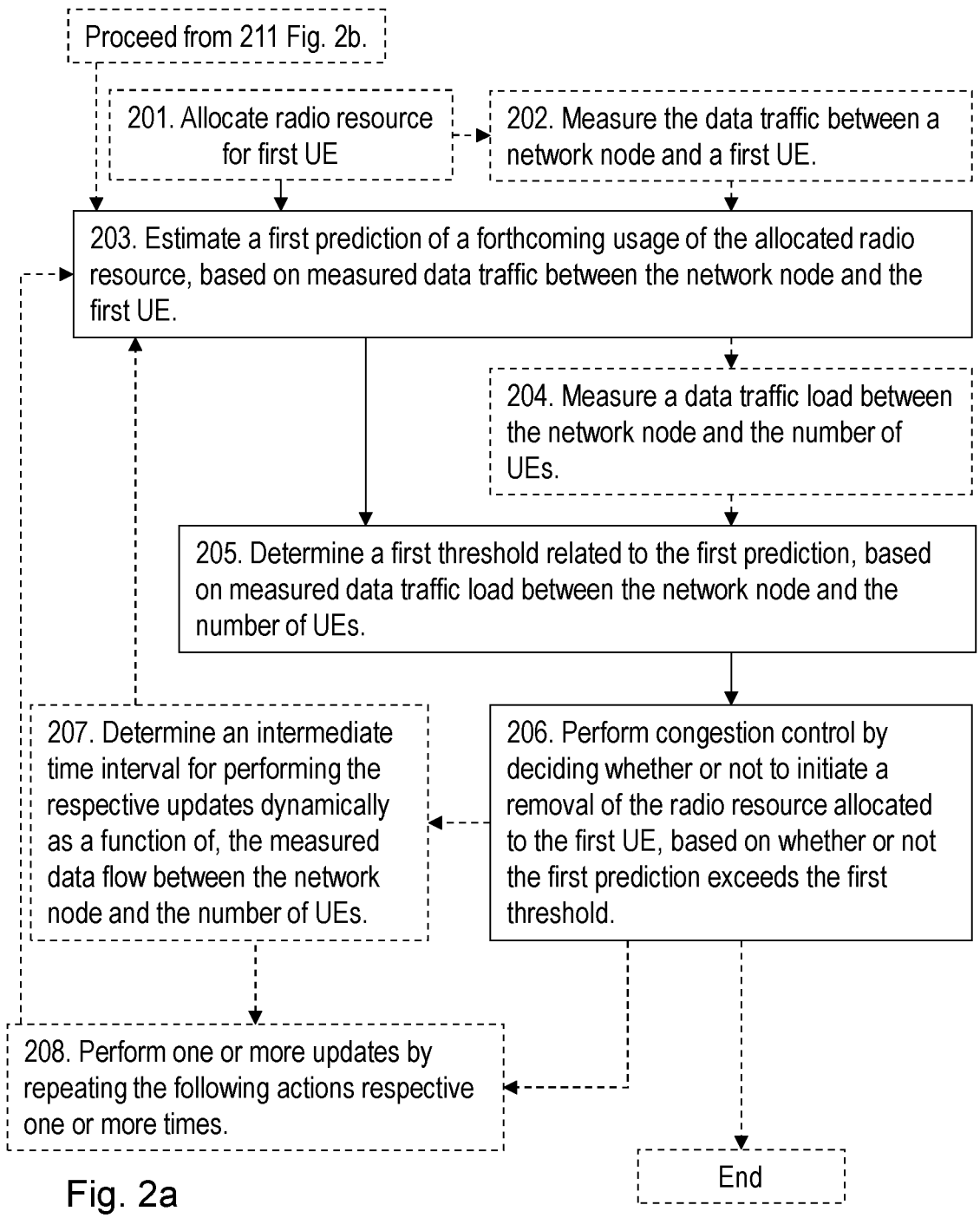
FIGS. 2 and b are flowcharts depicting embodiments of a method in a network node.
Figure 2B:
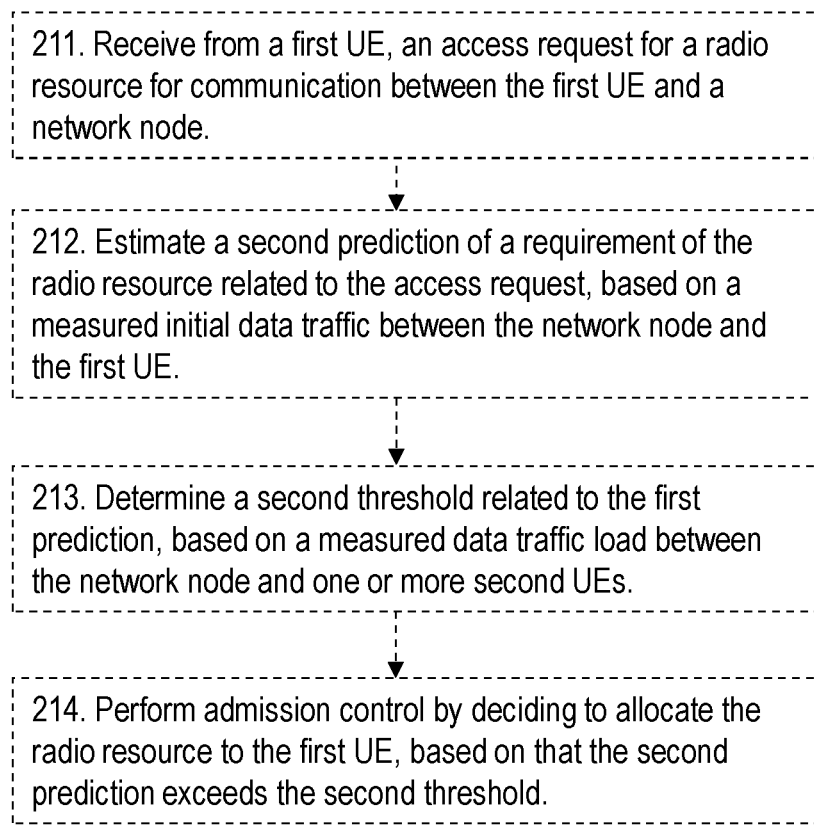

Example embodiments of a method performed by a network node 110 for improving performance in a wireless communications network 100, will now be described with reference to a flowchart depicted in FIGS. 2a and b. Whereof Actions 201-208 is shown in FIG. 2a and Actions 211-214 are shown in FIG. 2b. The network node 110 serves a number of UEs 121, 122 comprising a first UE 121 and one or more second UEs 122. The network node may comprise an ML model e.g. an ML model module.

The method comprises the following actions, which actions may be taken in any suitable order. Actions that are optional are presented in dashed boxes in FIGS. 2a and b.

Action 201

In an example scenario the first UE 121 has data to send or receive and therefore has been allocated a radio resource from the network node 110 and have access to the wireless communications network 100. In some embodiments the network node 110 has performed admission control and allocated the radio resource to the first UE 121. These embodiments will be described more in detail in Actions 211-214 and are depicted in FIG. 2b. Thus, a radio resource is allocated for communication between the first UE 121 and the network node 110.

Action 202

In order to handle the congestion control efficiently according to embodiments herein, the network node 110 needs to form an opinion about how the first UE 121 uses the allocated radio resource. This is will be used later on to predict the forthcoming usage of the allocated radio resource by the first UE 121. The network node 110 e.g. measures the data traffic between the network node 110 and the first UE 121. The measure may e.g. comprise signalling, total data volume in either direction, the total service time for the connection, or the time to the next data burst. This may not be performed, be performed or partly be performed by the ML model, depending on how the ML model is defined.

Action 203

The network node 110 estimates a first prediction of a forthcoming usage of the allocated radio resource, based on measured data traffic between the network node 110 and the first UE 121. This will be used later on as an input when deciding whether or not to initiate a removal of the radio resource allocated to the first UE 121. This prediction may be performed by a ML model which is described more in detail below. In this way the network node 110 may e.g. predict, such as e.g. learn, whether it is probable that UE 121 has a traffic pattern that requires very little or none radio resources e.g. only needs low BW for the forthcoming communication. A low BW demanding UE when used herein means an example of a UE that has low radio resource requirements on a current connection, it may e.g. be the bandwidth, response times, or any other characteristic that defines the network capabilities. A result of this estimated first prediction may be a value e.g. the probability value that the first UE 121 demands low BW, i.e. does not require high BW is e.g. 90%, or 50% or 30%, or as an alternative the probability may be measured in an opposite way, that the first UE 121 demands high BW is 30%, or 50% or 90%. A further alternative of a result of this estimated first prediction may be a value e.g. of total data volume in either direction, a total service time for the connection, or the time to the next data burst, either as a direct value or the probability that the level will be over or under a certain limit. This action may be performed by the ML model e.g. in the module residing in the network node 110.

Action 204

In order to handle the congestion control even more efficiently according to embodiments herein, the network node 110 needs to form an opinion about the available resources provided by the network node 110. It may be assumed that the network node 110 provides a limited radio resource pool. A large number of UEs comprising the first UE and the one or mere second UEs 122, communicating with the network node 110 may mean a high data traffic load demanding a lot of the radio resources provided by the network node 110. Vice versa, a small number of UEs comprising the first UE and the one or mere second UEs 122 may mean a low data traffic load demanding only a little of the radio resources provided by the network node 110. It should be noted that even few UEs may put a high load on the network if the demand is high enough. The network node 110 may thus measure a data traffic load between the network node 110 and the number of UEs 121, 122. This may not be performed, be performed or partly be performed by the ML model, depending on how the ML model is defined.

The wording data traffic load when used herein may e.g. comprise: Available radio resources in the network node 110 i.e. radio resources not used at the moment, quantity of used radio resources in the network node 110 i.e. radio resources that are used at the moment, data traffic pattern of the one or more second UEs 122, the number of connected UEs, the mobility activity i.e. the intensity of handovers, and the total data traffic transmitted.

The data traffic load may be measured by keeping track of the connected devices such as the first UE 121 and one or more second UEs 122 and their activities, continuously collecting characteristics of the individually and aggregated transmitted traffic, e.g. directions, pattern, volumes, timing information and statistics for the transmitted data entities.

Action 205

In order to handle the congestion control dynamically according to embodiments herein, the network node 110 decides a first threshold, e.g. a limit, based on the current data traffic load. The first threshold shall be used for the congestion control of the first UE 121 to decide whether or not to initiate a removal of the radio resource allocated to the first UE 121. Thus The network node 110 determines a first threshold related to the first prediction, as a function of a measured data traffic load between the network node 110 and the number of UEs 121, 122. This action may be performed by the ML model e.g. in the module residing in the network node 110.

In some embodiments, the first threshold is represented by a probability value related to the first prediction of the forthcoming usage of the allocated radio resource, e.g. that the first UE 121 is a low BW UE. In some alternative embodiments the first threshold comprises any other statistical measure e.g. a standard deviation, a statistical distribution, median value, etc.

According to embodiments herein, a first threshold may be determined for each UE communicating with radio resources from the radio network node 110. However, according to embodiments herein, the first threshold is determined dynamically and may therefore be changed from time to time. E.g. at a certain data traffic load the first threshold such as e.g. the probability limit, for predicting low BW demand may be determined to 40%. Further, in a really demanding data traffic load situation the first threshold for predicting low BW probability limit for low BW UE may be determined to be 10%. According to embodiments herein the dynamically determined first threshold allows for a much better accuracy when performing congestion control leading to that almost all scarce radio resources are allocated to the UEs that really need them, i.e. the UEs with the highest BW demands. In an example scenario the UEs with the lowest BW demands are prioritized since this will yield the highest positive impact on user experience.

This action of determining the first threshold related to the first prediction, as a function of a measured data traffic load between the network node 110 and the number of UEs 121, 122 may comprise determining the first threshold related to the first prediction, as a function of the measured data traffic load between the network node 110 and the number of UEs 121, 122. This e.g. means that when the traffic load changes, the first threshold may be changed.

Action 206

According to embodiments herein, the network node 110 now uses the estimated first prediction, and the determined first threshold as input to perform the congestion control. Thus the network node 110 performs congestion control by deciding whether or not to initiate a removal of the radio resource allocated to the first UE 121, based on whether or not the first prediction exceeds the first threshold. This may not be performed, be performed or partly be performed by the ML model, depending on how the ML model is defined.

According to an example scenario the first threshold is decided to be 70%. So if exceeding the threshold, the allocated radio resource shall be removed and if being below the first threshold the allocated radio resource shall be kept.

If the result of the estimated first prediction is a probability value of 90%, that the first UE 121 has a forthcoming usage of the allocated radio resource that relates to low BW demand, this means that the first prediction of 90% exceeds the first threshold that is 70%. The first UE 121 is therefore decided to be initiated for a removal of the allocated radio resource.

If the result of the estimated first prediction is a probability value of 50%, that the first UE 121 has a forthcoming usage of the allocated radio resource that relates to low BW demand, this means that the first prediction of 50% do not exceed the first threshold that is 70%. The first UE 121 is therefore decided to not be initiated for a removal of the allocated radio resource, the allocated radio resource will be kept.

According to an example scenario the first threshold is decided to be similar as the one given, but instead of probability, estimated total connection data volume, i.e. data traffic load is used. If a larger volume is expected than the threshold volume, keep additional resources, and vice versa.

Action 207

In some embodiments respective updates will be performed with an intermediate time interval e.g. when decided to not initiate a removal of the radio resource allocated to the first UE 121. In these embodiments, the network node 110 may determine an intermediate time interval for performing the respective updates dynamically as a function of the measured data flow between the network node 110 and the number of UEs 121, 122. This action may be performed by the ML model e.g. in the module residing in the network node 110.

Action 208

E.g. when decided to not initiate a removal of the radio resource allocated to the first UE 121, the network node 110 may perform one or more updates by repeating the following actions, as are described above, respective one or more times: Estimating 203 a first prediction of a forthcoming usage of the allocated radio resource, based on a measured data traffic between the network node 110 and the first UE 121, determining 205 a first threshold related to the first prediction, as a function of a measured data traffic load between the network node 110 and the number of UEs 121, 122, and performing 206 congestion control by deciding whether or not to initiate a removal of the radio resource allocated to the first UE 121, based on whether or not the first prediction exceeds the first threshold.

As mentioned above, the network node 110 may perform admission control before the congestion control process. This is to further improve the usage of the radio resources and may be performed according to Actions 211-214 below and is shown in FIG. 2b. This action may be performed by the ML model e.g. in the module residing in the network node 110.

Action 211

The network node 110 may receive from the first UE 121, an access request for a radio resource for communication between the first UE 121 and the network node 110.

Action 212

The network node 110 may estimate a second prediction of a requirement of the radio resource related to the access request, based on a measured initial data traffic between the network node 110 and the first UE 121. This action may be performed by the ML model e.g. in the module residing in the network node 110.

Action 213

The network node 110 may determine a second threshold related to the first prediction, as a function of a measured data traffic load between the network node 110 and the one or more second UEs 122. This action may be performed by the ML model e.g. in the module residing in the network node 110.

Action 214

The network node 110 may perform admission control by deciding to allocate the radio resource to the first UE 121, based on that the second prediction exceeds the second threshold. This action may be performed by the ML model e.g. in the module residing in the network node 110.

Embodiments herein such as mentioned above will now be further described and exemplified. The text below is applicable to and may be combined with any suitable embodiment described above.

As an example of how the solution may be used, a use case is considered with the network node 110 which e.g. is a Radio Base Station (RBS), mobile end users such as the first UE 121 and the second UEs 122, and a limited resource pool in the RBS. The pooled resources may be utilized by a limited number of UEs to enhance their individual performance, e g the bandwidth (BW), but each resource may only be utilized by a single UE such as e.g. the first UE 121. As a varying execution environment condition, the data traffic load in the network node 110 is used. To determine how the resources are best distributed, i e how to find the UEs with for example, but not limited to, the lowest BW requirements, also referred to as the UE with the lowest BW demands, two ML models executing in the network node 110 may be implemented to handle the Congestion Control (CC) and in some embodiments the Admission Control (AC), respectively. It is assumed that the individual cost for the first UE 121 to utilize the resource is low, i e no tangible cost on battery or any other UE associated resource. In the example the non-granted users may still have access but at a lower capability level.

The ML model in the CC part may supervise the utilization of the granted radio resources, and e.g. continuously monitor and predict near time utilization rate per UE such as for the first UE 121. This means that the network node 110 performs congestion control by deciding whether or not to initiate a removal of the radio resource allocated to the first UE 121, based on whether or not the first prediction exceeds a first threshold. So the network node 110 decides to initiate a removal of the radio resource allocated to the first UE 121 when the first prediction exceeds the first threshold. Further, the network node 110 decides to not initiate a removal of the radio resource admitted to the first UE 121 when the first prediction is below or equal the first threshold. E.g. in other words, if any UE is predicted to have a BW, for example, above the CC grant limit, the resource is seen as forfeited and is no longer granted to the UE. This mechanism also may lead to the resource pool not being fully utilized at all times, but also that the individual resource utilization is high.

In some embodiments AC is performed before the CC. In these embodiments, e.g. the ML of the AC part of the system may predict which UEs that will generate the highest demands on the resources, for example the highest BW. E.g. whether or not the resource utilization of the first UE 121 related to the access request of the first UE 121 exceeds a second threshold. It should be noted that the first threshold and the first prediction relate to congestion control, and the second threshold and the second prediction relate to admission control. This means that the network node 110 performs admission control by deciding to admit the radio resource to the first UE 121, when the second prediction exceeds the second threshold. E.g. in other words, if the predicted BW for a UE is above the admission limit, the UE is granted, also referred to as admitted, additional capacity from the limited resource pool, as long as there are any available resources left. This means that the pool of radio resources may not always be fully utilized, but that the radio resource utilization from the granted UEs will be high.

The AC grant limit such as the second threshold and the CC forfeit limit such as the first threshold may be of the same or different levels, depending on a desired hysteresis scheme.

The mechanism of give and remove grants to a user depending on the predicted forthcoming resource utilization allows for a flexible granting scheme that follows a UE's varying traffic pattern, for example throughput burstiness.

In a situation with low traffic load in the network node 110, a possible strategy for CC of the resources in the resource pool may be that each admitted UE such as e.g. the UE 121 keeps its allocated radio resources to achieve high BW. The requirements on any prediction of the demanded BW per UE are low, since the cost for a false prediction is low.

As the load in the network node 110 increases the pooled resources in the network node 110 start to get scarce, and thereby the importance of a correct BW prediction by the CC increases. In embodiments herein the first threshold, which is referred to as the limit in the example, in the ML model to predict high or low BW for a UE is dynamic. As mentioned above an example of a the first threshold is the probability of the prediction. In one prior art example, if the probability is higher than e g 50%, low BW is always predicted since the limit is fixed. However, according to embodiments herein, these limits are determined dynamically, and may therefore be dynamically changed, e g at a certain data traffic load at network node 110, the first threshold, e.g. the probability limit, for predicting low BW may be decided to and/or be changed to e.g. 40%. And in a really demanding data traffic load situation the probability limit for low BW may be decreased to 10%, allowing for a much better accuracy of the prediction leading to almost all scarce resources allocated to the UEs that really need them.

As the data traffic load decreases the limits such as the first threshold, may be relaxed, which means that less strict requirements on the statistical or traffic characteristics of the UE under observation have to be fulfilled before resources being granted, and these changes to the limits such as the first threshold may be gradually following a steering characteristic without any hard steps, allowing for optimal performance in any situation. In some embodiments the network node 110 determines the first threshold related to the first prediction, as a function of the measured data traffic load between the network node 110 and the number of UEs 121, 122. This may be performed by aggregating or collecting characteristics of the transmitted data traffic.

It is noteworthy that the environmental condition that steers the CC such as the RBS data traffic load in the example, the ML model indicator such as the prediction probability in the example, the resulting ML target such as the prediction accuracy in the example, and the controlled artifact such as the assigning of pooled BW resources in the example, are all examples and not limited to these given herein. The embodiments herein includes using one or more external characteristic measures to alter the ML model result used by CC, in order to achieve improved performance in a dynamic environment.

According to some embodiments herein, the CC algorithm e.g. comprising the actions 201-206 as described above, may be repeated per UE such as the first UE 121.

The CC algorithm may in some of these embodiments be repeated with statically intermediate time intervals, i.e. the same fixed intermediate time interval between the CC algorithms all the time without consider the load situation in the network node 110. As an alternative, the CC algorithm may as an advantageous alternative be repeated with dynamically determined intermediate time intervals, i.e. deciding the intermediate time intervals between the CC algorithms from time to time and for each time of deciding taking the load situation in the network node 110 into consideration. In this way, the CC algorithm may be repeated with intermediate time intervals which are dynamically changed. In a really demanding load situation, time interval between CC algorithms may be shortened allowing for a much more frequent CC process leading to almost all scarce resources allocated to the UEs 121, 122 that really need them. The UEs that really needs the resources may e.g. be UEs that uses a service that requires fast data communication for large data volumes in order to provide a good user experience.

As the load decreases the intermediate time intervals between AC algorithms may be extended, and these changes to the intermediate time intervals may be gradually following the steering characteristic without any hard steps, allowing for optimal performance in any situation. The network node 110 may e.g. determine an intermediate time interval for performing the respective updates dynamically as a function of the measured data flow between the network node 110 and the one or more second UEs 122

Figure 3:
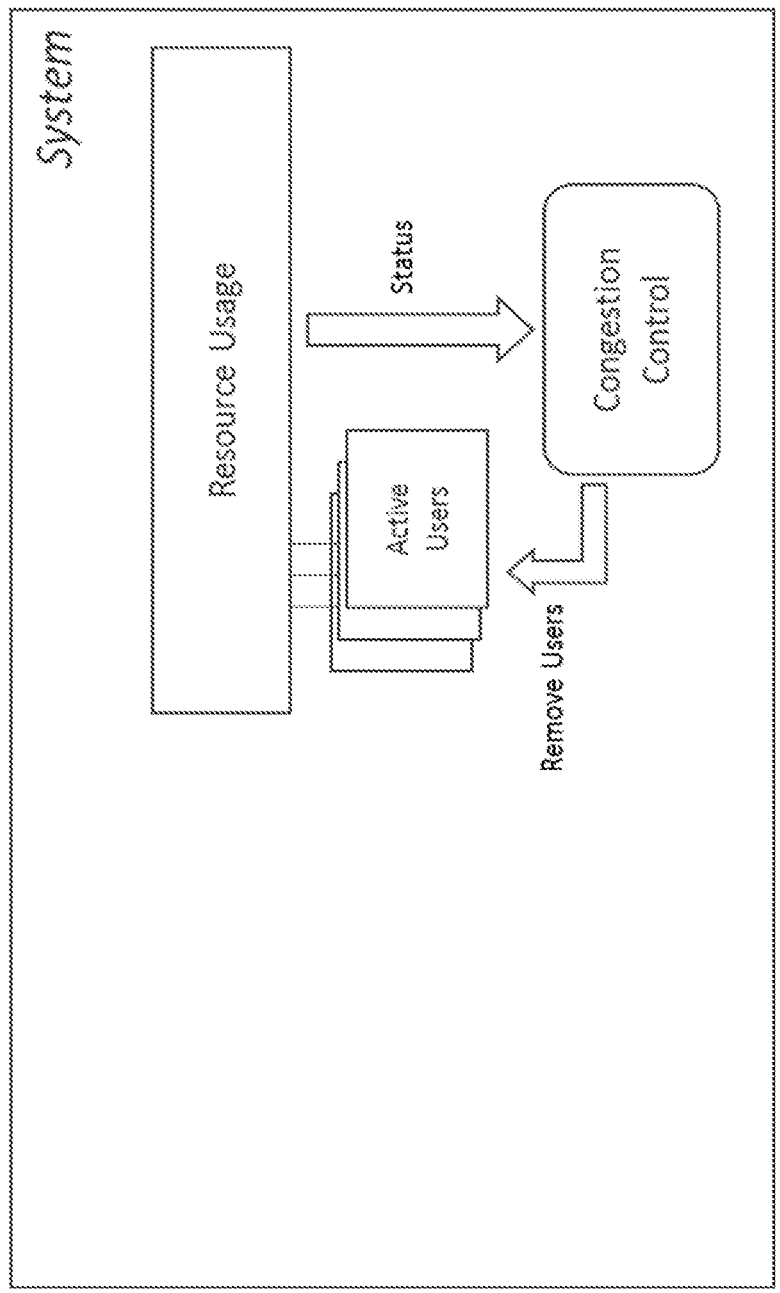
FIG. 3 is a schematic block diagram illustrating embodiments implemented in a network node.

FIG. 3 is a block diagram that in a schematic way shows how the CC works in a system such as the wireless communications network 100.

UEs, referred to as Users in FIG. 3, such as the first UE 121, that has allocated radio resources are referred to as Active users in FIG. 3 The network node 110 performs CC and either removes or keeps the UE's such as the first UE's 121 allocated resources, and UEs which keep their resources remain in the pool of resource usage users. The network node 110 may again perform CC and may remove allocated UEs at a later time, e.g. with dynamic time intervals between CC decisions.

FIG. 4 is a block diagram that in a schematic way shows how one or more Environmental Conditions such as the data traffic load is used as input to a ML Model and thereby impacts an output to the CC in the network node 110. As an example the CC performed by the network node 110, may control the usage of a limited resource pool in the network node 110, and the network node 110 may by means of the ML model decide which UEs that is to lose radio resources. The decision may be based on an initial observation period of each user's behavior, referred to as measuring the data traffic between the network node 110 and the and the first UE 121 in Action 202 above.

Figure 5:
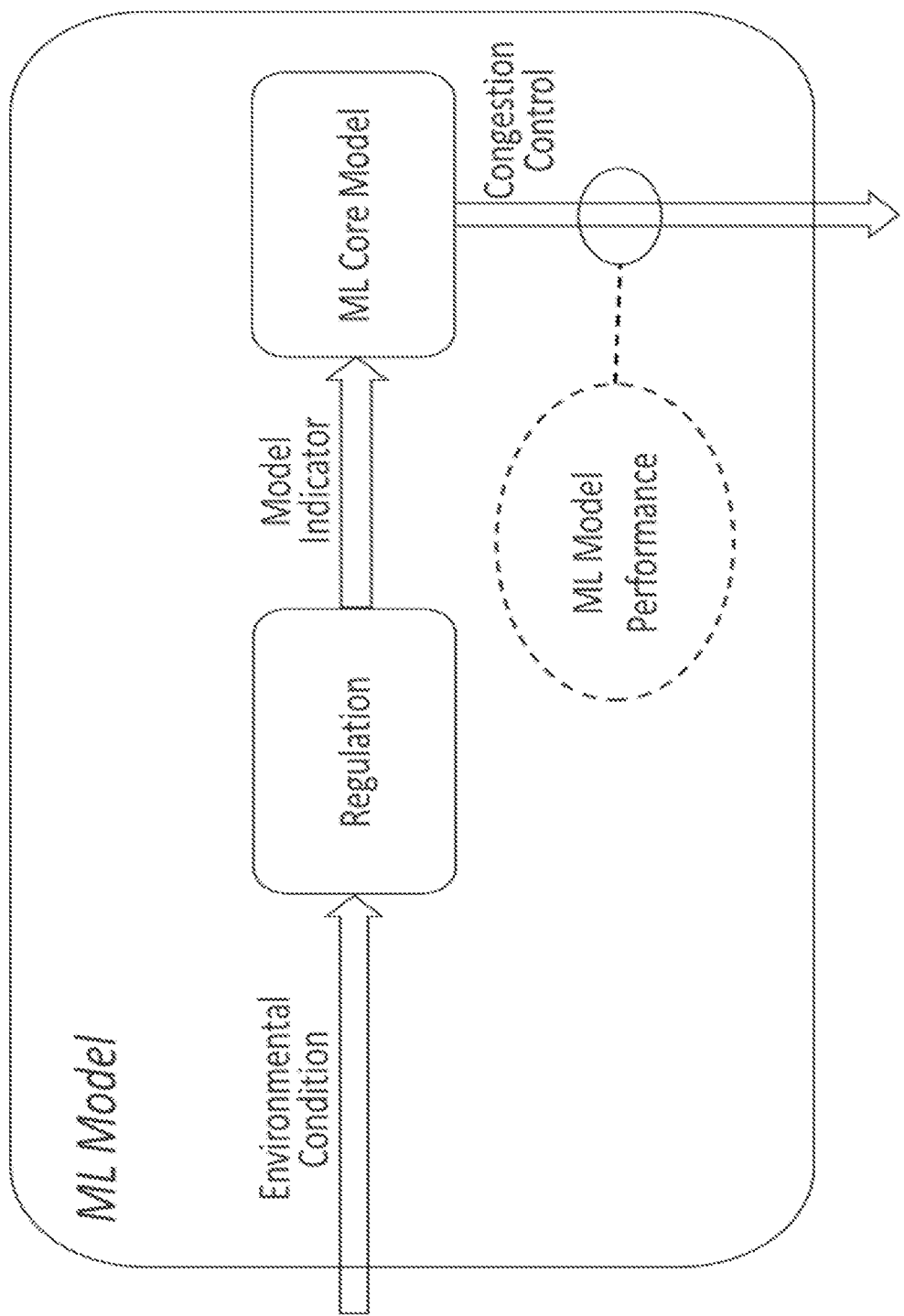
FIG. 5 is a schematic block diagram illustrating embodiments implemented in a network node.

FIG. 5 is a block diagram that in a schematic way shows in more detail how Environmental Condition signals such as data traffic load signals are used by a regulation addition to an ML Model, by producing a Model Indicator that the core of the ML Model may use to alter its decision of initiating a removal of the radio resource allocated to the first UE 121. The decision is then sent to the Congestion Control to be used when deciding whether or not radio resources should be kept or removed. The ML Model performance such as accuracy or any other model performance statistic may constantly monitored.

The wording regulation addition when used herein mean a complementary function that uses input from the environment, data traffic load, network node or any other related artifact that may assist in providing additional input or conditions to the regulation.

The wording model indicator when used herein may mean a complementary condition or input parameter to the regulation.

The wording core of the ML Model when used herein mean an actual prediction function that, by being pre-trained on similar input data, from a set of input data can give an accurate prediction of the requested quantity.

The wording ML model performance when used herein mean a valid statistic of how well the ML model performs, e.g. how accurate the prediction is or how fast the prediction is determined.

Figure 6:
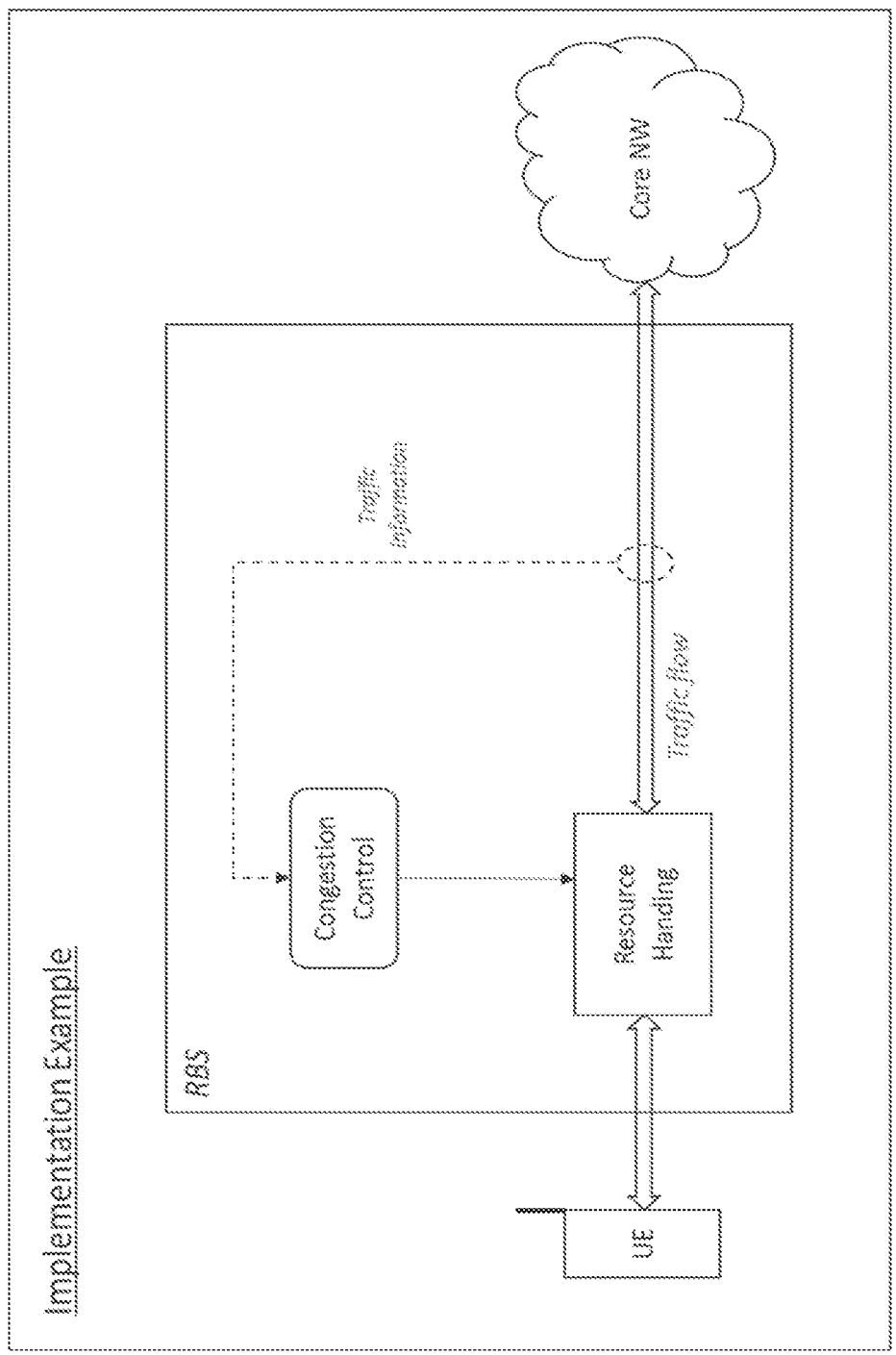
FIG. 6 is a schematic block diagram illustrating embodiments implemented in a network node.

FIG. 6 is a block diagram that in a schematic way shows how embodiments herein may be implemented and used, in the example scenario as described above, such that e.g. the radio resources are allocated to the UEs that can make best use of them. The data traffic load of the first UE 121 is measured. The network node 110 may then e.g. by means of the ML Model estimating the first prediction of a forthcoming usage of the allocated radio resource, based on a measured data traffic between the network node 110 and the first UE 121, as The regulation such as e.g. the first threshold is determined based on measured data traffic load of the number of UEs 121, 122, as referred to in Action 204 above. These are the inputs to the congestion control in FIG. 6. The ML Model may thus predict whether the first UE 121 will benefit from keeping the allocated radio resources, or if they are not needed they shall be removed.

The data traffic load between the network node 110 and the number of UEs 121, 122 and the data traffic between the network node 110 and the and the first UE 121 may be measured again at intermediate time intervals dependent on environmental conditions such as the data traffic load, and the ML Model may then predict again whether the first UE 121 will benefit from whether the first UE 121 will benefit from keeping the allocated radio resources, or if they are not needed they shall be removed. The decision is taking the environmental conditions such as the data traffic load into account, thereby enabling a dynamic access scheme dependent on the current situation.

Figure 7:
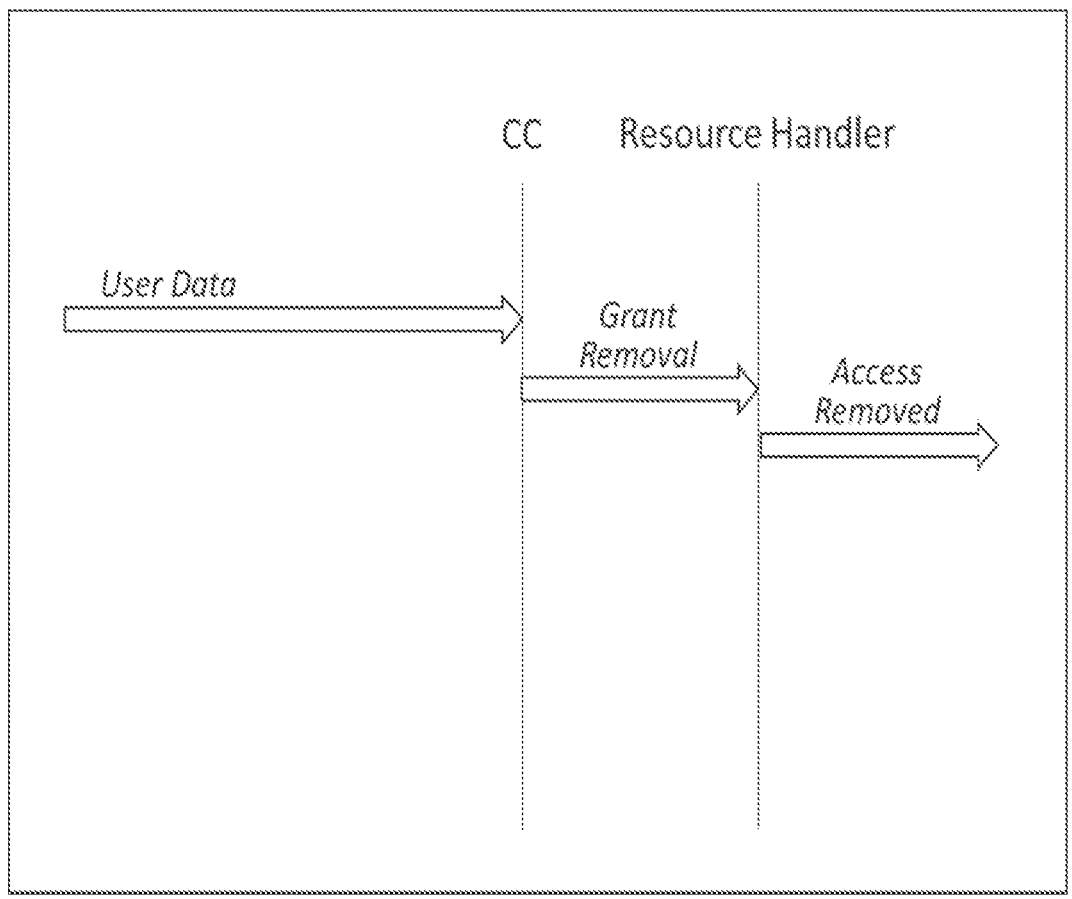
FIG. 7 is a signaling diagram illustrating embodiments herein.

FIG. 7 is a sequence diagram that in a schematic way illustrates an example of a signaling flow within an ML model module residing in the network node 110 according to an example embodiment. User Data is presented to the CC, such as e.g. the first threshold is determined based on measured data traffic load of the second UEs 122. The CC sends a Grant Removal signal to the Resource Handler when it is decided to initiate a removal of the radio resource allocated to the first UE 121. This results in a decision by the Resource Handler to remove the radio resources and signal Access Removed as a monitor signal to the UE if requested. This process may be repeated with dynamic time intervals.

Figure 8:
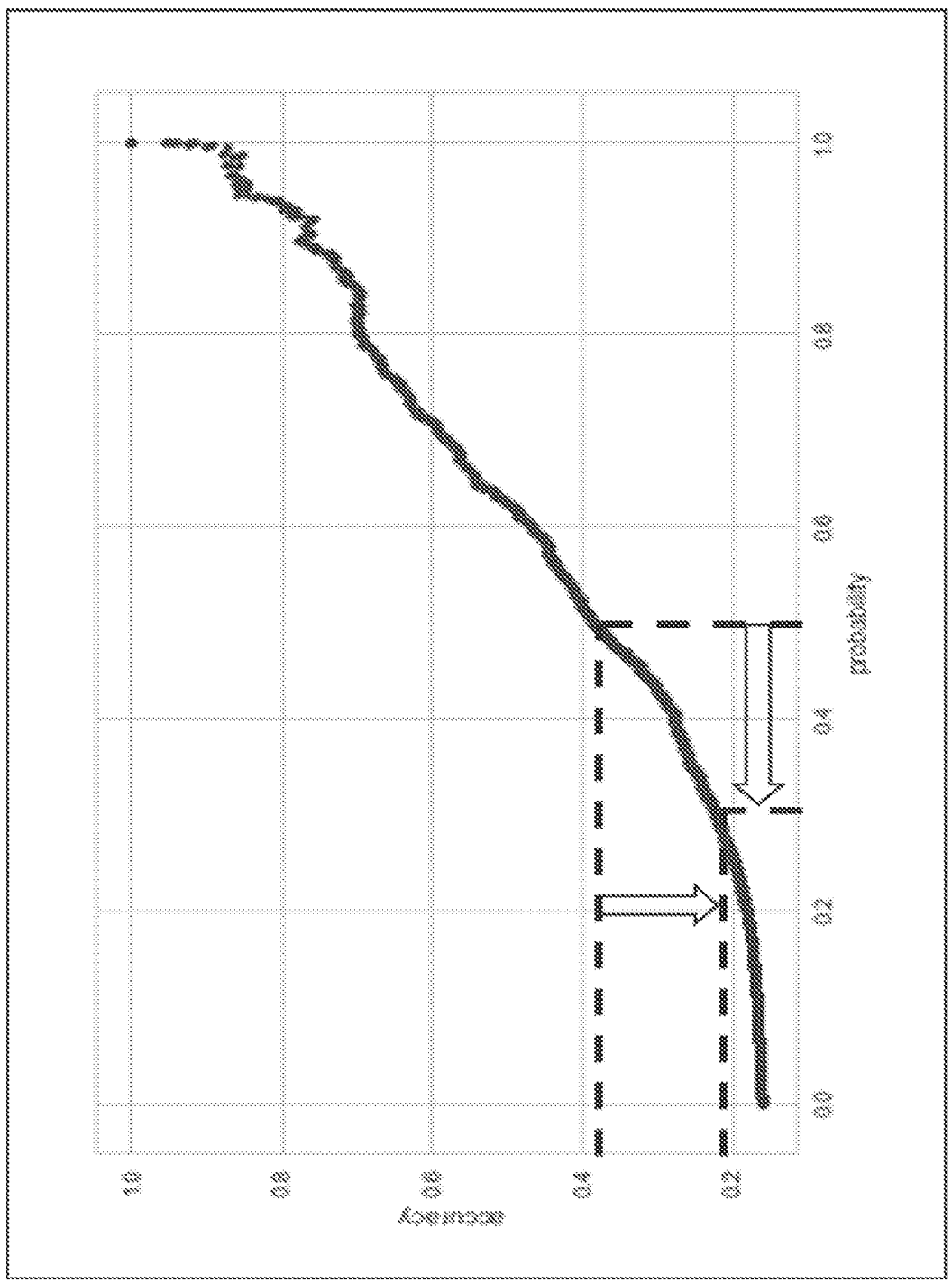
FIG. 8 is a diagram illustrating embodiments herein.

FIG. 8 illustrates an example how embodiments herein may work as a diagram of a Precision-at-Top distribution for the network node 110 such as its ML model for prediction of the first and/or second threshold. The diagram shows relationship between accuracy and probability. The accuracy axis of the diagram refers to the accuracy of the part of the predictions above the breaking point in the graph, the breaking point meaning the point where the dashed lines meet. The probability of the diagram refers to the estimated first prediction which may be a probability that the prediction is correct. The default value for prior art decisions is the probability 0.5, this is shown in the diagram for comparison with embodiments herein. The wording Precision-at-Top when used herein means the resulting precision distribution when prediction outcomes are sorted in falling probability and the resulting precision for the share of the samples from the top to any given point are calculated. By using the Environmental Condition as a trigger, the first and/or second threshold e.g. the probability limit, for the classification may be different from 0.5 when the data traffic load is taken into consideration, such as e g 0.8. which may yield a much higher percentage of correctly predicted targets. The curve here is the precision/accuracy depending on where the threshold is set, and if resources are scarce the threshold is cranked upwards also referred to as tightened. Hereby the fewer samples included have higher probability of being correct, and hence the precision/accuracy increase. The wording correctly predicted targets when used herein means the share of predictions that are shown to be correct, meaning that when the outcome of the predicted activity or entity is revealed whether or not this outcome corresponds with the predicted value. Both the Probability and the Accuracy may be changed to other characteristics for other applications of embodiments herein. Further, both the Probability and the Accuracy may be changed over time to other characteristics for other applications of embodiments herein.

Figure 9:
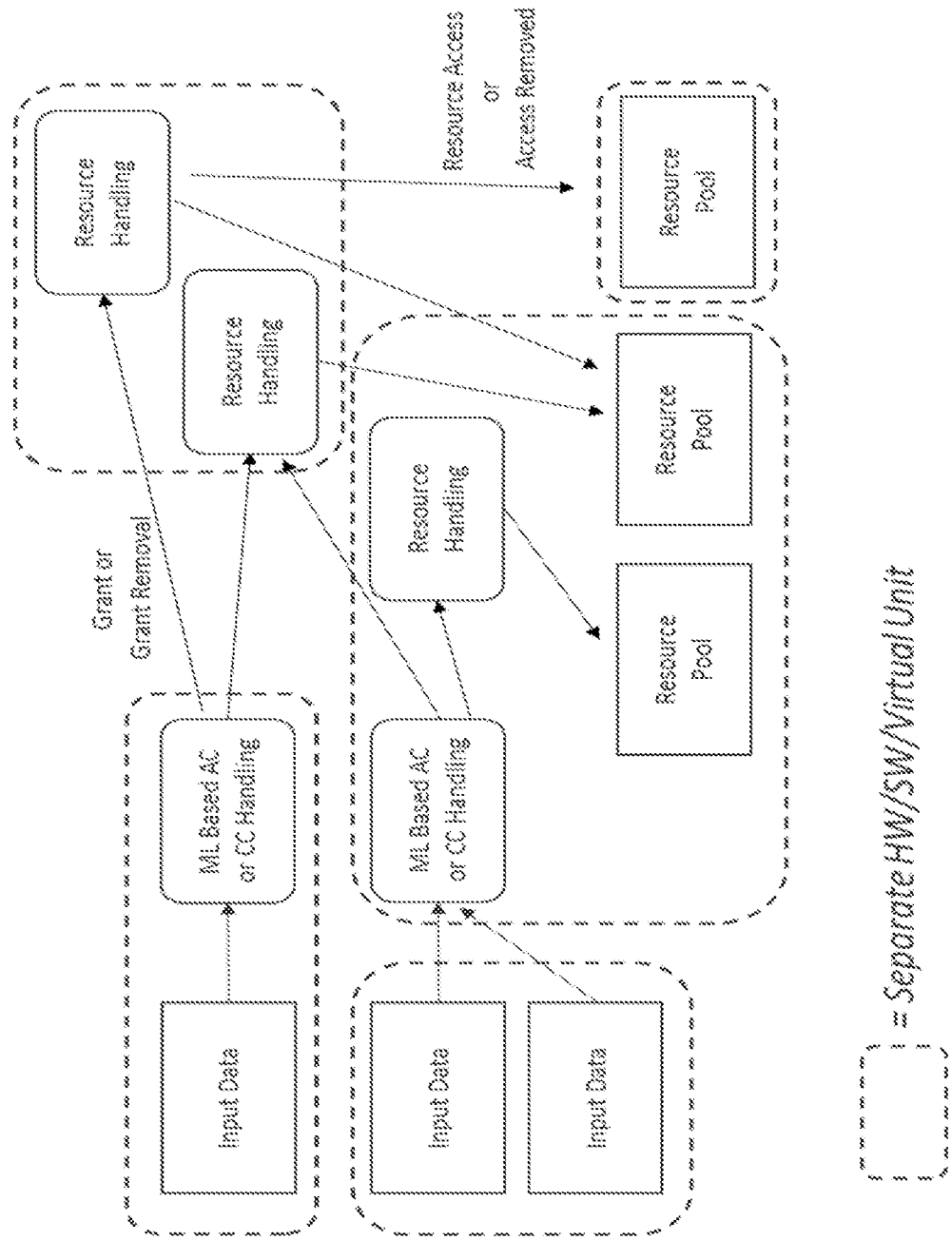
FIG. 9 is a schematic block diagram illustrating embodiments implemented in a wireless communications network.

Embodiments herein work well in a distributed computing environment, and any of the building blocks may be implemented on a separate Hard Ware (HW) unit or server, or as a separate thread or process in any operating system environment, or as a virtual block executing in a cloud configuration. FIG. 9 shows an example scenario of how the included parts may be configured to operate over separate HW/Soft Ware (SW)/Virtual units.

Figure 10:
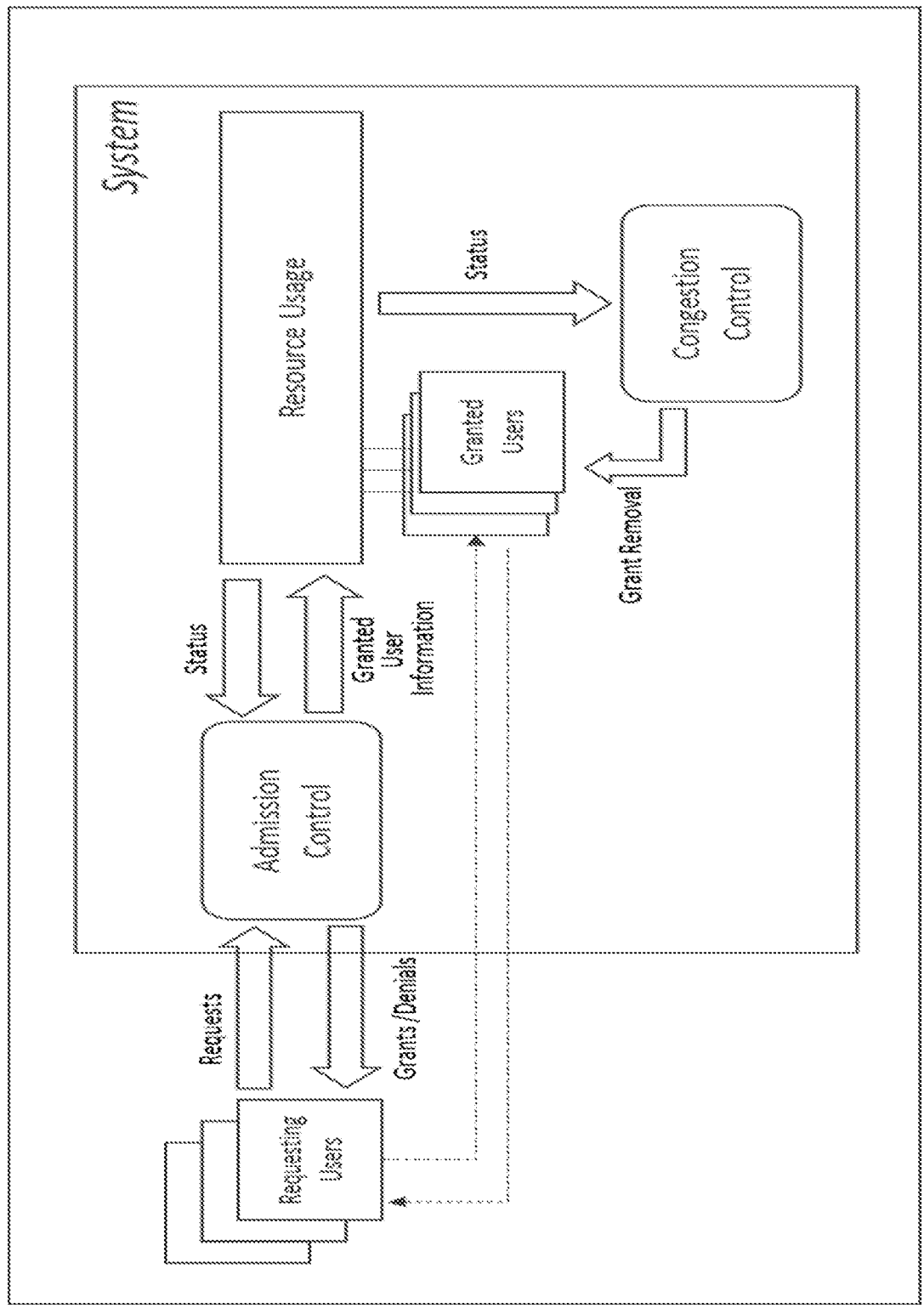
FIG. 10 is a schematic block diagram illustrating embodiments implemented in a wireless communications network.
Figure 11:
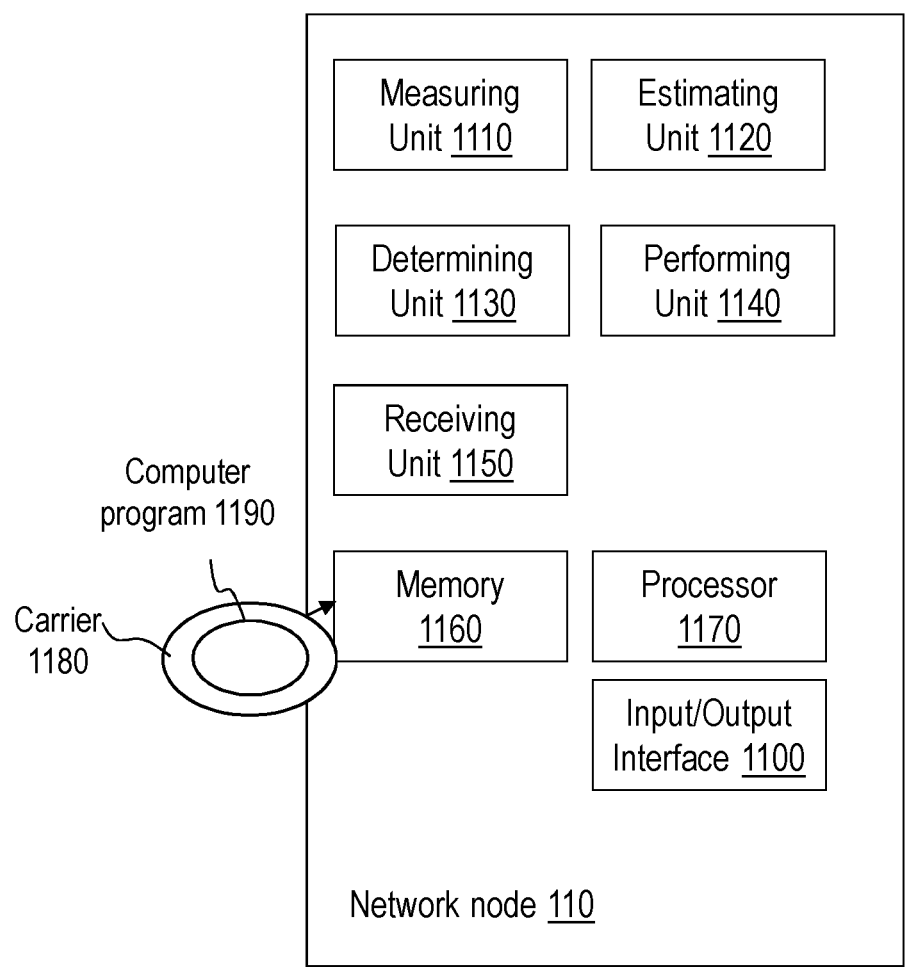
FIG. 11 is a schematic block diagram illustrating embodiments of a network node.

FIG. 10 is a block diagram that in a schematic way shows an example of how the AC in combination with CC work in a system such as the wireless communications network 100. UEs, referred to as Users in FIG. 11, such as the first UE 121, send requests requesting access to radio resources referred to as resources in FIG. 11. The network node 110 performs AC and either grants or denies the requests. I.e. the network node 110 performs admission control by deciding whether or not to admit the radio resource to the first UE 121, based on whether or not the second prediction exceeds the second threshold. The admitted UEs 121 which is referred to as granted users in FIG. 11 are included in a pool of resource usage. Denied users may send a request again, wait or give up.

After UEs are being admitted, also referred to as granted, to resource usage, the UEs forthcoming resource utilization are predicted. This means that the network node 110 estimates a first prediction of a forthcoming usage of the allocated radio resource, based on a measured data traffic between the network node 110 and the first UE 121, and determine a first threshold related to the first prediction, based on a measured data traffic.

The network node 110 then performs congestion control by deciding whether or not to initiate a removal of the radio resource admitted to the first UE 121, based on whether or not the first prediction exceeds the first threshold.

This means that the grant may be removed if utilization is predicted to be below a certain level.

In some embodiments, the traffic is continuously monitored by the network node 110 and will predict whether the UE will benefit from additional resources or not e.g. by means of ML Models in the AC and CC parts. The AC part may request resources in the network node 110 to be allocated to a specific UE such as the first UE 121, and the CC part may request resource removal for this UE.

In an example scenario, User Data such as a measure of an initial data traffic, is presented in an AC part in the network node 110, which in case it predicts high resource utilization sends a Resource Grant to a Resource Handler in the network node 110. The Resource Handler may then give resource access to the specific user such as the first UE 121. At that point the CC part in the network node 110 starts predicting the forthcoming resource utilization, and in case a too low utilization is predicted a Grant Removal indication is sent to the Resource Handler in the network node 110, which then may remove the resource from the this UE. The AC part may then start predicting resource demands again, and so on.

Embodiments herein provide a way of dealing with varying conditions e.g. by means of an ML model, to dynamically adjust its behavior depending on the loaded cell conditions, such as the data traffic load in the network node 110, in some embodiments also over time, and improve the performance in the CC when it matters the most. Modern traffic patterns are bursty and vary significantly over long and short usage terms. According to embodiments herein, both an individual UE's demands may be met, as well as the system's demand such as the wireless communications network's 100 demand, for efficient usage of the resources. Embodiments herein provide UE differentiation.

An example use case is a situation when loaded cell conditions require higher precision when predicting UEs with low bandwidth demands, e.g. in a situation where cell resources such as the allocated radio resource may be taken away if the radio resource demand of the first UE 121 is predicted to decrease. Another example use case is a situation when rerunning the CC with a dynamic time interval, depending on the loaded cell conditions, e.g. the data traffic load in the network node 110.

However, embodiments herein may be applied in a much broader perspective and may include any CC applications for any different environment condition, various prediction targets, any model characteristics, and any model performance metrics. The dynamic connection between the environmental conditions, the ML model bi-products like probability, and the ML model performance metrics is a fundamental part, and that this connection will produce better results when needed the most.

To perform the method actions for improving performance in a wireless communications network 100, the network node 110 may comprise the arrangement depicted in FIG. 11. As mentioned above, the network node 110 is configured to serve a number of UEs 121, 122 comprising the first, UE 121 and the one or more second UEs 122, where the first UE 121 is adapted to have a radio resource allocated for communication between the first UE 121 and the network node 110.

The network node 110 may comprise an input and output interface 1100 configured to communicate e.g. with the network node 110. The input and output interface 1100 may comprise a wireless receiver (not shown) and a wireless transmitter not (shown).

The network node 110 may further be configured to, e.g. by means of a measuring unit 1110 comprised in the network node 110, any one or more out of: measure the data traffic between the network node 110 and the first UE 121, and measure a data traffic load between the network node 110 and the number of UEs 121, 122.

The network node 110 is further configured to, e.g. by means of an estimating unit 1120 comprised in the network node 110, estimate a first prediction of a forthcoming usage of the allocated radio resource, based on a measured data traffic between the network node 110 and the first UE 121.

The network node 110 is further configured to, e.g. by means of a determining unit 1130 comprised in the network node 110, determine a first threshold related to the first prediction, as a function of a measured data traffic load between the network node 110 and the number of UEs 121, 122.

In some embodiments, the first threshold is represented by a probability value related to the first prediction of a forthcoming usage of the allocated radio resource.

The network node 110 is further configured to, e.g. by means of a performing unit 1140 comprised in the network node 110, perform congestion control by deciding whether or not to initiate a removal of the radio resource allocated to the first UE 121, based on whether or not the first prediction exceeds the first threshold.

The network node 110 may further be configured to, e.g. by means of the performing unit 1140 comprised in the network node 110, when decided to not initiate a removal of the radio resource allocated to the first UE 121, perform one or more updates by repeating the following actions respective one or more times:

e.g. by means of the estimating unit 1120, estimate a first prediction of a forthcoming usage of the allocated radio resource, based on a measured data traffic between the network node 110 and the first UE 121, and e.g. by means of the determining unit 1130, determine a first threshold related to the first prediction, as a function of a measured data traffic load between the network node 110 and the number of UEs 121, 122, and e.g. by means of the performing unit 1140, perform congestion control by deciding whether or not to initiate a removal of the radio resource allocated to the first UE 121, based on whether or not the first prediction exceeds the first threshold.

The network node 110 may further be configured to perform the respective updates with an intermediate time interval, and wherein the network node 110 further is configured to: e.g. by means of the determining unit 1130, determine an intermediate time interval for performing the respective updates dynamically as a function of the measured data flow between the network node 110 and the number of UEs 121, 122.

The network node 110 may further be configured to determine the first threshold related to the first prediction, as a function of a measured data traffic load between the network node 110 and the number of UEs 121, 122, e.g. by means of the determining unit 1130, determine the first threshold related to the first prediction, as a function of the measured data traffic load between the network node 110 and the number of UEs 121, 122.

The network node 110 may further be configured to the following:

e.g. by means of a receiving unit 1150 comprised in the network node 110, receive from the first UE 121, an access request for a radio resource for communication between the first UE 121 and the network node 110, and e.g. by means of the estimating unit 1120, estimate a second prediction of a requirement of the radio resource related to the access request, based on a measured initial data traffic between the network node 110 and the first UE 121, and e.g. by means of the determining unit 1130, determine a second threshold related to the first prediction, as a function of a measured data traffic load between the network node 110 and the one or more second UEs 122, and e.g. by means of the performing unit 1140, perform admission control by deciding to allocate the radio resource to the first UE 121, based on that the second prediction exceeds the second threshold.

The embodiments herein may be implemented through a respective processor or one or more processors, such as a processor 1170 of a processing circuitry in the network node 110 depicted in FIG. 11, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1160 comprising one or more memory units. The memory comprises instructions executable by the processor in the network node 110. The memory 1160 is arranged to be used to store e.g. data, configurations, thresholds, predictions, determined intermediate time intervals, measurements, and applications to perform the methods herein when being executed in the network node 110.

In some embodiments, a respective computer program 1190 comprises instructions, which when executed by the respective at least one processor 1170, cause the at least one processor 1170 of the network node 110 to perform the actions above.

In some embodiments, a respective carrier 1180 comprises the respective computer program 1190, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the network node 110 mentioned above may refer to a combination of analog and digital circuits, and/or one or more processor configured with software and/or firmware, e.g. stored in the network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Further Extensions and Variations

Figure 12:
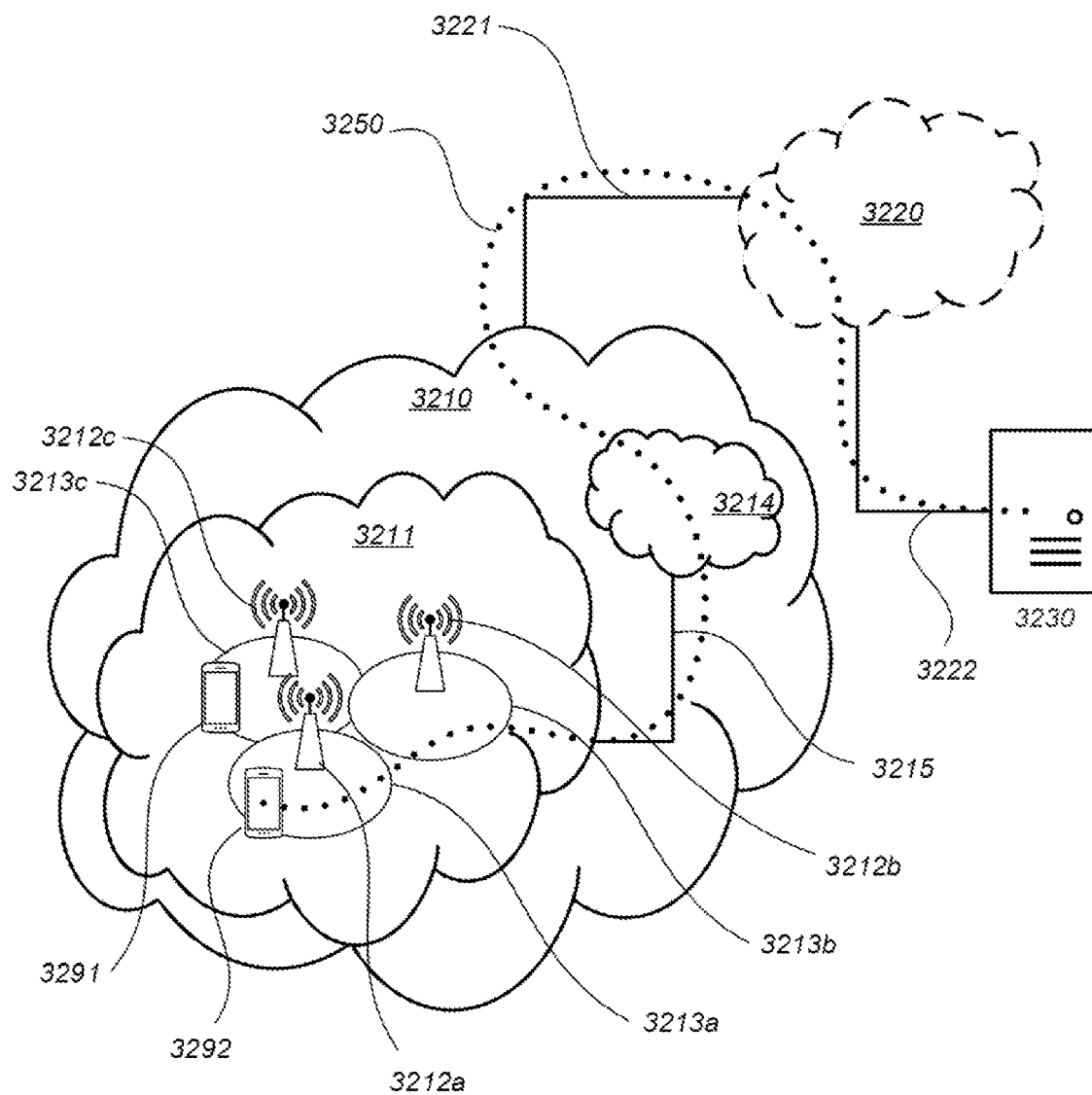
FIG. 12 schematically illustrates a telecommunication network connected via an intermediate network to a host computer.

With reference to FIG. 12, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3212a, 3212b, 3212c. Each base station 3212a, 3212b, 3212c is connectable to the core network 3214 over a wired or wireless connection 3213. A first user equipment (UE) e.g. the UE 120 such as a Non-AP STA 3291 located in coverage area 3212c is configured to wirelessly connect to, or be paged by, the corresponding base station 3212c. A second UE 3292 e.g. the wireless device 122 such as a Non-AP STA in coverage area 3212a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 12, respectively. This is to say, the inner workings of these entities may be as shown in FIG. 13 and independently, the surrounding network topology may be that of FIG. 12.

Figure 13:
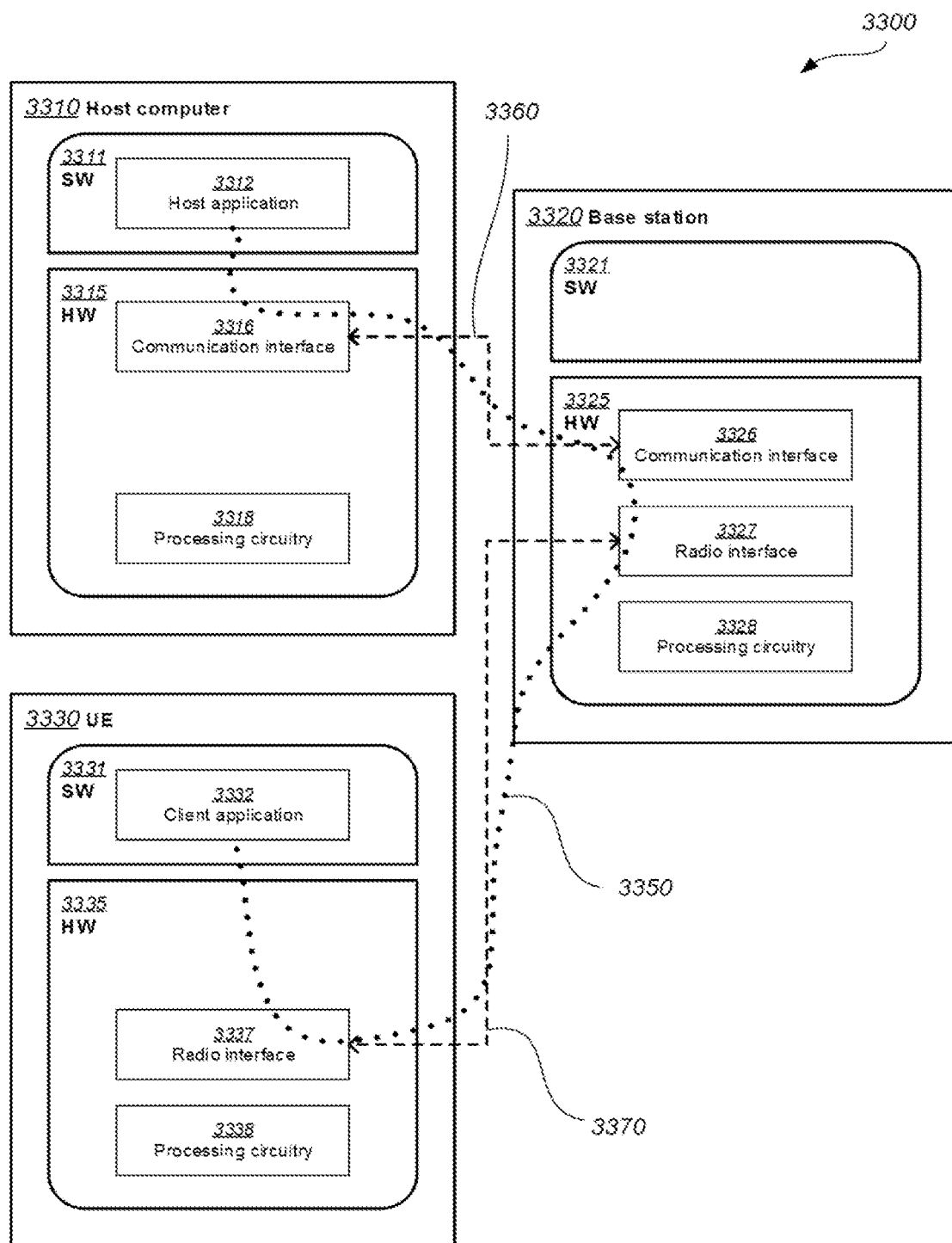
FIG. 13 is a generalized block diagram of a host computer communicating via a base station with a user equipment over a partially wireless connection.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 14 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 15 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 16 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 17 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for improving performance in a wireless communications network, which network node serves a number of User Equipments (UEs) comprising a first UE and one or more second UEs, wherein the first UE has a radio resource allocated for communication between the first UE and the network node, the method comprising:
    estimating, based on a measured data traffic between the network node and the first UE, a first prediction of a forthcoming usage of the allocated radio resource;
    determining a first threshold related to the first prediction as a function of a measured data traffic load between the network node and the number of UEs; and
    performing congestion control by deciding, based on whether or not the first prediction exceeds the first threshold, whether or not to initiate a removal of the radio resource allocated to the first UE.

2. The method of claim 1, wherein the first threshold is represented by a probability value related to the first prediction of a forthcoming usage of the allocated radio resource.

3. The method of claim 1, further comprising at least one of:
    measuring the data traffic between the network node and the first UE, or
    measuring the data traffic load between the network node and the number of UEs.

4. The method of claim 1, when decided to not initiate a removal of the radio resource allocated to the first UE:
    performing one or more updates by performing a process that comprises:
    estimating a second prediction of a second forthcoming usage of the allocated radio resource based on measured data traffic between the network node and the first UE;
    determining a second threshold related to the second prediction; and
    performing congestion control by deciding whether or not to initiate removal of the radio resource allocated to the first UE based on whether or not the second prediction exceeds the second threshold.

5. The method of claim 4, wherein the respective updates are performed with an intermediate time interval, the method further comprising:
    determining an intermediate time interval for performing the respective updates dynamically as a function of the measured data flow between the network node and the number of UEs.

6. The method of claim 1, the method further comprising:
    receiving from the first UE an access request;
    estimating a second prediction of a requirement related to the access request based on initial data traffic between the network node and the first UE;
    determining a second threshold; and
    performing admission control based on whether the second prediction exceeds the second threshold.

7. A non-transitory computer readable medium storing a computer program comprising instructions, which when executed by a processor, causes the processor to perform the method of claim 1.

8. A network node for improving performance in a wireless communications network, which network node is configured to serve a number of User Equipments (UEs) comprising a first UE and one or more second UEs, wherein the first UE is adapted to have a radio resource allocated for communication between the first UE and the network node, the network node being configured to:
    estimate, based on a measured data traffic between the network node and the first UE, a first prediction of a forthcoming usage of the allocated radio resource;
    determine a first threshold related to the first prediction as a function of a measured data traffic load between the network node and the number of UEs; and
    perform congestion control by deciding whether or not to initiate a removal of the radio resource allocated to the first UE based on whether or not the first prediction exceeds the first threshold.

9. The network node of claim 8, wherein the first threshold is represented by a probability value related to the first prediction of a forthcoming usage of the allocated radio resource.

10. The network node of claim 8, the network node further being configured:
    measure the data traffic between the network node and the first UE, and/or
    measure the data traffic load between the network node and the number of UEs.

11. The network node of claim 8, further being configured to, when decided to not initiate a removal of the radio resource allocated to the first UE, perform one or more updates by performing a process that comprises:
    estimating a second prediction of a second forthcoming usage of the allocated radio resource based on measured data traffic between the network node and the first UE;
    determine a second threshold related to the second prediction; and
    perform congestion control by deciding whether or not to initiate removal of the radio resource allocated to the first UE based on whether or not the second prediction exceeds the second threshold.

12. The network node of claim 11, wherein the network node is configured to perform the respective updates with an intermediate time interval, and wherein the network node further is configured to:
  determine an intermediate time interval for performing the respective updates dynamically based on as a function of the measured data flow between the network node and the number of UEs.

13. The network node of claim 8, the network node further being configured to:
  receive from the first UE an access request;
  estimate a second prediction of a requirement related to the access request based on initial data traffic between the network node and the first UE;
  determine a second threshold; and
  perform admission control based on whether the second prediction exceeds the second threshold.

* * * * *